Sept. 22, 1970     S. STEINBERG     3,530,461
ELECTROMAGNETIC INDICATING WHEEL APPARATUS
Filed April 23, 1969     2 Sheets-Sheet 1
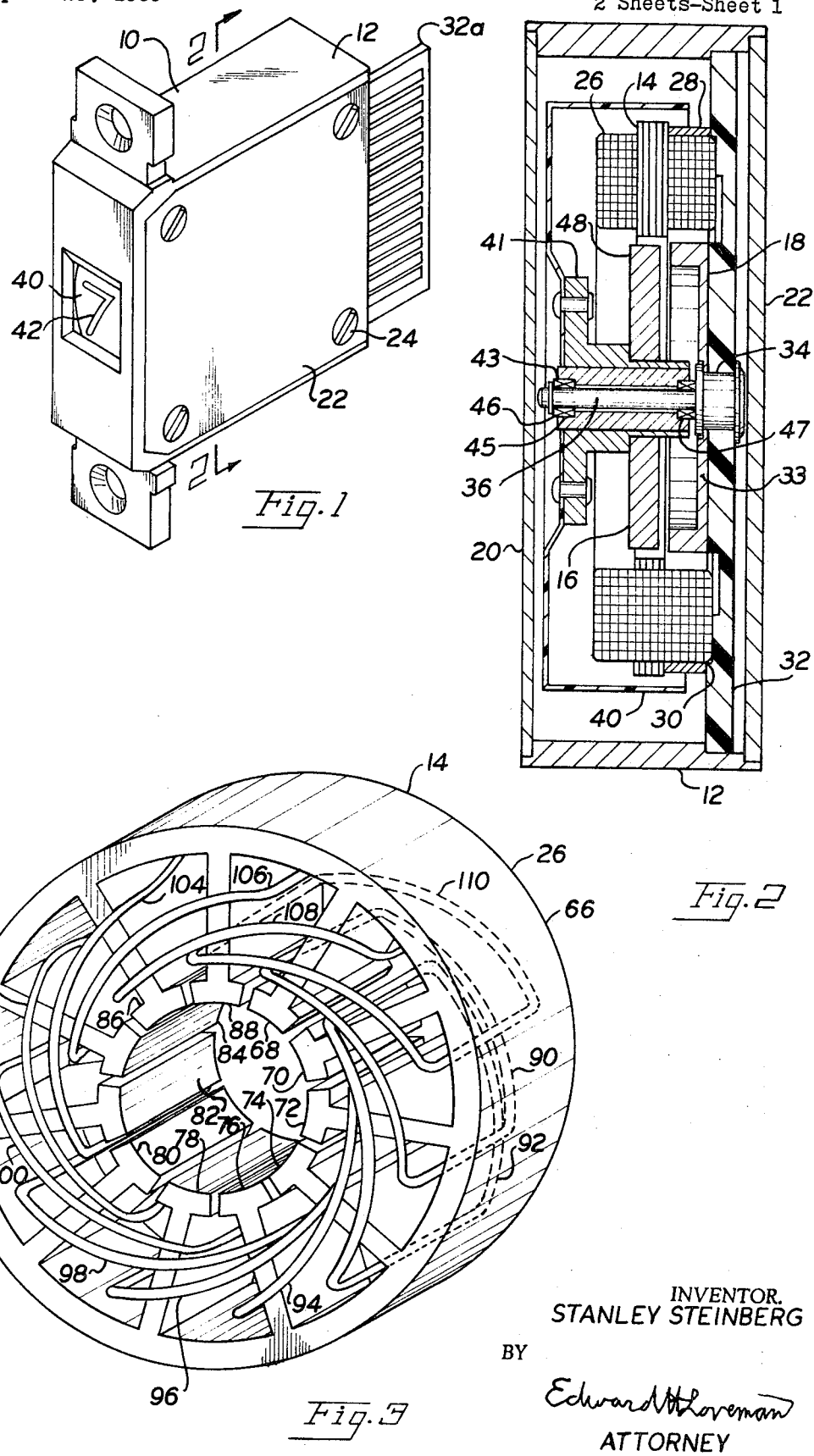
INVENTOR.
STANLEY STEINBERG
BY
Edward H Loveman
ATTORNEY INVENTOR.
STANLEY STEINBERG
BY
Edward H Loveman
ATTORNEY United States Patent Office 3,530,461
Patented Sept. 22, 1970

1

3,530,461
ELECTROMAGNETIC INDICATING
WHEEL APPARATUS
Stanley Steinberg, Plainview, N.Y., assignor to Vernitron
Corporation, New York, N.Y., a corporation of
Delaware
Filed Apr. 23, 1969, Ser. No. 818,506
Int. Cl. G08b 5/22
U.S. Cl. 340—378                                3 Claims

ABSTRACT OF THE DISCLOSURE

The invention pertains to an improved electromagnetic indicator incorporating a novel two-pole magnetic rotor. The magnetic rotor has two poles of different arcuate widths or extent for insuring that the poles of the rotor properly align, lock and detent to stator salient pole when it is energized.

---

The present invention relates to electromagnetic indicator apparatus and, more particularly, to an electromagnetic indicator apparatus having a permanent magnet rotor which is adjustably positioned to any one of a plurality of discrete positions by electrical impulses selectively applied to electromagnets surrounding the rotor. The invention specifically is an improvement in an elecromagnetic indicator apparatus of the type disclosed in U.S. patent application 661,308, filed Aug. 17, 1967, in the names of Alvin J. Silverman and Albert Diamond.

As disclosed in the aforementioned patent application, ambiguities in the direction the indicator rotor will move when 180° of rotation is commanded is solved by having an asymmetric magnetic formation on the tips of the magnetic poles of the rotor. The asymmetric magnetic formation does not affect alignment of the rotor with an attracting energized stationary electromagnet pole but the formation will misalign the rotor with respect to the energized electromagnet whenever a 180° reversal of angular position is commanded. This novel prior art arrangement operates generally very satisfactorily in indicators having an even number of stationary electromagnets or electromagnetic pulsed positions. In electromagnetic indicators having an odd number of stationary electromagnets, there is no necessity to provide for the asymmetric formation on the tips of the magnetic rotor poles as described hereinabove, inasmuch as none of the stationary electromagnets are ever diametrically opposed to one another and, consequently, the two-pole rotor is never required to rotate exactly 180°. However, in electromagnetic indicators of this type (odd number of poles), having distributed stator windings, that is, windings surrounding more than one electromagnetic stator pole, it has been ascertained that a two-pole symmetrical magnetic rotor will not lock or detent to a stator salient pole in an energized electromagnetic position.

The present electromagnetic indicator apparatus obviates and eliminates the drawbacks and problems encountered in the prior art by providing an improved and novel electromagnetic rotor which will positively and accurately lock or detent to an energized stator salient pole. Essentially, the present invention contemplates the use of an electromagnetic two-pole rotor construction in which each pole of the rotor has a different arcuate width or extent. Thus, for example, when the stator windings are distributed so that each coil winding encompasses three adjacent stator poles and a stator salient pole is thereby formed by these coil winding encompassed poles, the arcuate extent of one rotor pole is formed co-extensive with the width of three projected stator poles, whereas the other rotor pole is formed co-extensive with the width of two projected stator poles. In this instance, the term projected stator pole is defined to mean the arcuate distance of the stator pole equivalent to the distance between and including the width of the stator pole when radially projected to the peripheral or diametral dimension of the rotor pole.

Accordingly, it is a primary object of the present invention to provide for a novel and improved electromagnetic indicating apparatus having a plurality of discrete angularly spaced indicating positions.

Another object of the present invention is to provide for an improved electromagnetic indicating apparatus which will cause an electromagnetic rotor to rotate to a predetermined energized electromagnetic position.

A further object of the present invention is to provide for an electromagnetic indicating apparatus of the type described herein wherein the poles of the electromagnetic two-pole rotor have different arcuate extents so as to cause the rotor to positively detent or lock to an energized electromagnetic position.

These and other objects and many of the attendant advantages of this invention will be readily appreciated as the same becomes better understood by reference to the following detailed description when considered in connection with the accompanying drawings, in which:

FIG. 1 is an isometric view of an assembled electromagnetic indicating apparatus constructed in accordance with the present invention;

FIG. 2 is a sectional view taken along line 2—2 in FIG. 1;

FIG. 3 is a perspective view of the electromagnetic stator used in the present invention;

Figure 4:
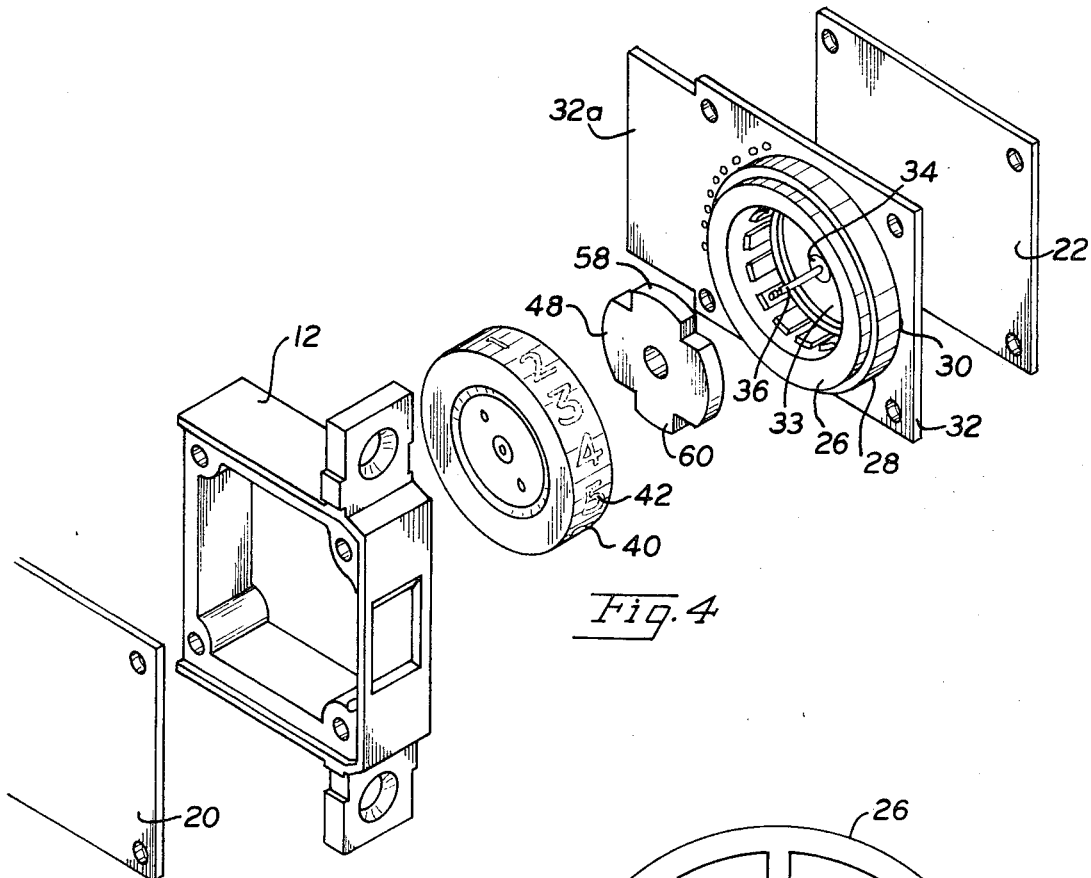
FIG. 4 is an exploded perspective view of the indicating apparatus shown in FIG. 1.

Referring now to the drawings, wherein like reference characters designate like or corresponding parts throughout the several views, there is shown in FIGS. 1 through 4 an indicating or readout apparatus generally designated by reference numeral 10. The apparatus 10 comprises essentially a housing 12, a stator assembly 14, and a rotor assembly 16. The stator assembly 14 and rotor assembly 16 may be mounted together so as to constitute a sub-assembly 18 which is secured in housing 12 by a pair of plates 20 and 22 fastened to the opposite ends of the housing 12 by means of conventional fasteners 24.

The stator assembly 14 comprises a stator unit 26 and an annular sleeve 28 which is adapted to be mounted in a suitable recess 30 in a printed circuit board 32, the latter of which may, if desired, comprise a portion of plate 22. As illustrated in FIGS. 1 and 2, the circuit board 32 is positioned in housing 12 and includes a portion 32a projecting therefrom so as to facilitate connection to suitable electrical lead wires. The printed circuit board 32 includes a centrally mounted stationary hub 34 having an elongated stationary cantilevered shaft portion 36 extending centrally through housing 12. Also included on the circuit board 32 is a disc 33 which is adapted to engage the inner periphery of stator unit 26 thereby centralizing the stator unit about shaft portion 36.

Figure 5:
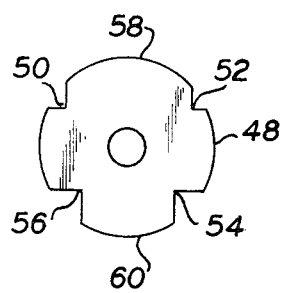
FIG. 5 is a front elevational detail view of the electromagnetic two-pole rotor used in the present invention.

The rotor assembly 16 essentially comprises an indicator drum 40 having suitable indicia 42 printed or engraved on the outer peripheral flange thereof. A hollow cylindrical shaft or sleeve 44 is fastened to the central portion of indicator drum 40 by means of an enlarged end 41 which may be riveted or otherwise attached to the drum surface. The bore 43 of sleeve 44 is adapted to slip-fit over stationary shaft 36 whereby the latter in effect rotatably supports the rotor assembly 16. Antifriction bearings 46 may be positioned in the enlarged ends 45 and 47 of the sleeve 44 so that the rotor assembly 16 may freely rotate about the cantilevered shaft 36. An electromagnetic rotor 48 is firmly mounted on sleeve 44 and rotatable therewith. As shown in FIGS. 4 and 5, the magnetic rotor 48 is comprised of a two-pole magnet constituted of a generally flat plate manufactured from a magnetizable material. The rotor is generally disc-shaped and includes a plurality of cut corners 50, 52, 54 and 56 so as to comprise a cross-shaped member having a plurality of diametrically opposed poles 58 and 60. As illustrated in FIG. 4, the pole 58 is considerably smaller in arcuate width or extent as compared to the pole 60. In actuality, the arcuate extent of pole 58 is effectively the width of two projected stator poles, whereas the width of pole 60 is effectively the width of three stator poles, as may be ascertained by referring to FIG. 6 of the drawings.

Referring now to FIG. 3, there is shown a magnified view of the stator 26 comprised of a core 66 having a plurality of angularly spaced radially outstanding teeth 68–88. In effect, the teeth 68–88 are equally disposed in an angular array on the inner circumference of the core 66 and may be longitudinally coextensive with the core having a generally T-shaped cross-sectional configuration. It is preferable that the core 66 and its teeth 68–88 be formed of a plurality of laminations of magnetically soft material which are cemented or otherwise formed together. Electrical conductors or wires are wound about the teeth 68–88 to form a plurality of coils 90–110. As appears schematically in FIG. 3, each coil 90–110 extends about three teeth. The angular distance or arc encompassed by each coil may be considered as the pole arc or pole pitch. Each of the individual coils may be connected to a common or ground potential.

Figure 6:
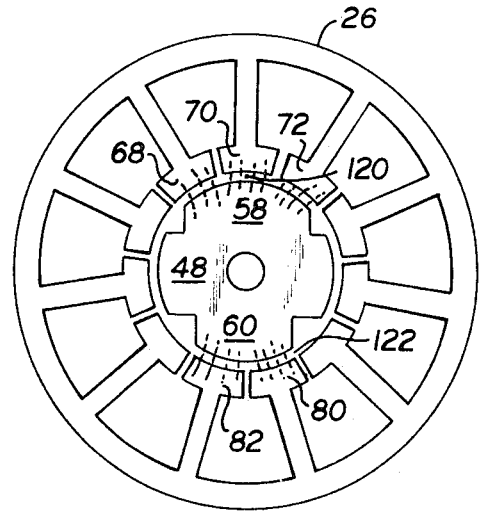
FIG. 6 is a diagrammatic representation of a magnetic rotor pole aligned with a pair of stator poles by attracting energization of one phase of the stator winding.

As best illustrated in FIG. 6, a salient pole 120 comprised of teeth 68, 70 and 72 may be obtained when the coil 90 is energized by passage of a current in one direction. The salient pole 120 thereby attracts into alignment the opposite polarity pole 58 of permanent magnet 55. As shown in FIG. 6, the magnetic lines of force produced by the salient pole 120 are symmetrical therewith and pass through the attracted pole 58 of permanent magnet 48 substantially in symmetry with the latter. This condition is particularly true when as in this case the sum of the cross-sectional areas of the teeth 68, 70 and 72 is essentially equal to the cross-sectional area of the magnetic pole 58 of the rotor and thus the magnetic pole 58 may be termed a projected stator pole (68, 70 and 72). Moreover, since the stator poles 80 and 82 are substantially in alignment with the rotor pole 60, the magnetic field established therewith locks and detents the rotor in this position. The pole 60 may, of course, also be termed a projected stator pole (80, 82).

Thus as the magnetic rotor 48 rotates in the air gap 122 it becomes clearly evident that the rotor pole 58 will align itself with the three energized stator teeth forming the salient pole, and that the rotor pole 60 will align and lock or detent itself to the two stator teeth diametrically opposed to the stator salient pole. This, in essence, will assure the positive and exact positioning of the rotor assembly 16 relative to an energized stator salient pole.

Although rotor 48 has been illustrated as a single magnetic structure, it may obviously be formed of a magnetizable plate and two pole magnet as described in the Silverman et al. copending patent application 750,071.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. In an electromagnetic indicator of the type wherein a two-pole magnetic rotor is coupled to an indicator drum and is angularly positionable in response to the energization of one of a plurality of salient poles on an annular stator surrounding said rotor, said stator having an odd plurality of inwardly projecting teeth and a plurality of coils, each of said coils being wound about a plurality of adjacent teeth whereby a salient pole is formed by said adjacent teeth upon energization of the coil wound thereupon, the improvement comprising, said two-pole magnetic rotor having generally radially opposed rotor poles of different arcuate extents, whereby the one arcuate extent rotor pole will be aligned with said salient pole and the other arcuate extent rotor pole will lock said rotor to said stator.

2. The elecromagnetic indicator as defined in claim 1, wherein said arcuate extents are equal to different projected stator poles.

3. The electromagnetic indicator as defined in claim 1, wherein one of said rotor poles comprises an arcuate extent of approximately the effective width of two of said stator poles, and the other rotor pole comprises an arcuate extent of approximately the effective width of three stator poles.

References Cited

UNITED STATES PATENTS 3,465,334   9/1969   Cohen et al. _____ 340—378

HAROLD I. PITTS, Primary Examiner

U.S. Cl. X.R.

340—324, 325, 366